(12) United States Patent
Denchev et al.

(10) Patent No.: US 11,449,760 B2
(45) Date of Patent: Sep. 20, 2022

(54) QUANTUM ASSISTED OPTIMIZATION

(71) Applicant: Google LLC, Mountain View, CA (US)

(72) Inventors: Vasil S. Denchev, West Lafayette, IN (US); Masoud Mohseni, Redondo Beach, CA (US); Hartmut Neven, Malibu, CA (US)

(73) Assignee: Google LLC, Mountain View, CA (US)

( * ) Notice: Subject to any disclaimer, the term of this patent is extended or adjusted under 35 U.S.C. 154(b) by 1002 days.

(21) Appl. No.: 16/096,237

(22) PCT Filed: Dec. 30, 2016

(86) PCT No.: PCT/US2016/069381
§ 371 (c)(1),
(2) Date: Oct. 24, 2018

(87) PCT Pub. No.: WO2017/189052
PCT Pub. Date: Nov. 2, 2017

(65) Prior Publication Data
US 2019/0164059 A1 May 30, 2019

Related U.S. Application Data

(60) Provisional application No. 62/327,384, filed on Apr. 25, 2016.

(51) Int. Cl.
*G06N 3/12* (2006.01)
*G06N 10/00* (2022.01)
*G06N 5/00* (2006.01)

(52) U.S. Cl.
CPC ............ *G06N 3/126* (2013.01); *G06N 5/003* (2013.01); *G06N 10/00* (2019.01)

(58) Field of Classification Search
CPC ......... G06N 3/126; G06N 5/003; G06N 10/00
See application file for complete search history.

(56) References Cited

U.S. PATENT DOCUMENTS 7,875,876 B1 * 1/2011 Wandzura .............. B82Y 10/00
257/26
2013/0290919 A1 * 10/2013 Narayanaswamy .........................
G06F 30/3323
716/106

(Continued)

FOREIGN PATENT DOCUMENTS

| CN | 1672171 | 9/2005 |
|---|---|---|
| WO | WO 2013/006836 | 1/2013 |
| WO | WO 2015/143439 | 9/2015 |

OTHER PUBLICATIONS

Zhu et al., Efficient Cluster Algorithm for Spin Glasses in Any Space Dimension, Aug. 14, 2015, 5 pages (Year: 2015).*

(Continued)

*Primary Examiner* — Omar F Fernandez Rivas
*Assistant Examiner* — Tri T Nguyen
(74) *Attorney, Agent, or Firm* — Fish & Richardson P.C.

(57) ABSTRACT

Methods and apparatus for quantum assisted optimization. In one aspect, a method includes obtaining a set of initial input states, applying one or more of (i) dynamical thermal fluctuations and (ii) cluster update algorithms to the set of input states and subsequent input states when the states evolve within the classical information processors, applying dynamical quantum fluctuations to the set of input states and subsequent states when the states evolve within the quantum systems and repeating the application steps until a desirable output state is obtained.

27 Claims, 5 Drawing Sheets

(56) References Cited

U.S. PATENT DOCUMENTS

| | | | | | |
|---|---|---|---|---|---|
| 2014/0297247 | A1* | 10/2014 | Troyer | ................... | G06F 30/20 703/21 |
| 2015/0269124 | A1* | 9/2015 | Hamze | ................... | G06N 20/00 703/2 |
| 2015/0363708 | A1* | 12/2015 | Amin | ................... | G06N 10/00 712/42 |
| 2016/0335558 | A1* | 11/2016 | Bunyk | ................... | G06N 10/00 |

OTHER PUBLICATIONS

CN Office Action in Chinese Application No. 201680086099.9, dated May 21, 2021, 35 pages (with English translation).
Earl et al. "Parallel Tempering: Theory, Applications, and New Perspectives," arXiv:physics/0508111v2, Aug. 19, 2005, 21 pages.
Houdayer. "A Cluster Monte Carlo Algorithm for 2-Dimensional Spin Glasses," arXiv: cond-mat/0101116v3, May 28, 2001, 6 pages.
PCT International Search Report and Written Opinion issued in International Application No. PCT/US2016/069381, dated Apr. 20, 2017, 17 pages.
PCT Written Opinion issued in International Application No. PCT/US2016/069381, dated Mar. 28, 2018, 8 pages.
CA Office Action in Canadian Application No. 3022037, dated Jul. 14, 2020, 5 pages.
Chancellor, "Runback experiments on the D-Wave device" Presentation at Durham University, Jun. 2015, 16 pages.

\* cited by examiner

QUANTUM ASSISTED OPTIMIZATION

BACKGROUND

This specification relates to quantum computing.

Optimization tasks can be translated into machine learning optimization problems. In an annealing method of optimization, an optimal solution to a computational task is encoded in a lowest energy configuration of a physical system. The lowest energy configuration may be achieved by thermal annealing, for example cooling down the system approaching zero temperature, or quantum annealing, for example tunneling through energy barriers.

SUMMARY

This specification relates to constructing and programming quantum hardware for information processing. In particular, this specification describes technologies for a hybrid quantum-classical information processor for solving optimization and inference problems.

In general, one innovative aspect of the subject matter described in this specification can be implemented in a method that includes the actions of obtaining a set of initial input states, applying one or more of (i) dynamical thermal fluctuations and (ii) cluster update algorithms to the set of input states and subsequent input states when the states evolve within the classical information processors, applying dynamical quantum fluctuations to the set of input states and subsequent states when the states evolve within the quantum systems, and repeating the application steps until a desirable output state is obtained.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the dynamical classical fluctuations comprise tempered transitions.

In some implementations tempered transitions comprise a parallel tempering algorithm.

In some cases the dynamical classical fluctuations comprise weighted dynamical tempered transitions.

In other cases weighted dynamical tempered transitions comprise annealing importance sampling.

In some implementations the cluster update algorithms create non-local state transformation in parameter space in various different temperatures.

In some cases the cluster update algorithms create non-local isothermal state transformation in parameter space.

In some implementations the cluster update algorithms comprise Houdayers cluster move algorithm.

In other implementations dynamic quantum fluctuations comprise increasing and decreasing zero-temperature quantum fluctuations via applying driven fields.

In some implementations dynamic quantum fluctuations comprise increasing and decreasing finite-temperature dissipative quantum fluctuations via applying driven fields.

In some implementations convergence to final desired state is achieved via feed forward steps in a highly parallelizable set of classical and quantum processors.

In some cases convergence to final desired state is iterative with feedback loops on a same set of quantum and/or classical processors.

In some aspects a method includes obtaining an initial input state of a quantum system, performing quantum annealing and one or more of (i) parallel tempering, or (ii) a cluster update algorithm, on a sequence of input states until a completion of a first event, wherein quantum annealing is performed with dynamic quantum fluctuations, and determining that the completion of the first event has occurred.

In some implementations dynamic quantum fluctuations comprise increasing and decreasing quantum fluctuations.

In some cases the quantum system is associated with a corresponding non-convex energy landscape comprising multiple energy barriers, and performing parallel tempering on the sequence of input states comprises: performing parallel tempering on a first input state and subsequent input states to overcome one or more energy barrier until an energy barrier that cannot be overcome by parallel tempering is encountered; and terminating parallel tempering on the initial input state and subsequent input states in response to determining that the energy barrier cannot be overcome by parallel tempering.

In some cases the quantum system is associated with a corresponding energy landscape comprising multiple energy barriers, and performing a cluster update algorithm on the sequence of input states comprises: performing a cluster update algorithm on the sequence of input states to overcome an energy barrier that cannot be overcome by parallel tempering.

In some implementations the quantum system is associated with a corresponding non-convex energy landscape comprising multiple energy barriers, and performing quantum annealing on the sequence of input states comprises: determining that an energy barrier that cannot be overcome by the cluster update algorithm is encountered; in response to determining that an energy barrier that cannot be overcome by the cluster update algorithm is encountered, performing quantum annealing on the sequence of input states to overcome the energy barrier that cannot be overcome by the cluster update algorithm.

In some cases the quantum system is associated with a corresponding non-convex energy landscape comprising multiple energy barriers, and performing parallel tempering on a sequence of input states comprises: generating a plurality of replicas of the initial input state of the quantum system; for each of a set of different temperatures, evolving one or more of the replicas of the initial input state of the quantum system; and exchanging pairs of evolved replicas at different temperatures according to Metropolis criterion to overcome one or more energy barriers.

In some implementations evolving one or more replicas of the initial input state of the quantum system is performed in parallel using multiple copies of the initial input state and quantum system.

In other implementations evolving one or more replicas of the initial input state of the quantum system is performed sequentially for each replica of the initial input state of the quantum system in turn.

In some cases performing quantum annealing and one or more of (i) parallel tempering, or (ii) a cluster update algorithm, on a sequence of input states comprises: generating a plurality of replicas of the initial input state of the quantum system; performing a first predetermined number of Metropolis updates for each replica at a given temperature; growing a second predetermined number of Houdayer replicas; determining whether a percolation threshold for an energy landscape associated with the quantum system is above or below a predetermined threshold; in response to determining that the percolation threshold for the energy landscape associated with the quantum system is above the predetermined threshold, performing one or more Houdayer cluster moves on the replicas for temperatures less than a predetermined temperature value; in response to determining that the percolation threshold for the energy landscape associated with the quantum system is below the predetermined threshold, performing one or more Houdayer cluster moves on the replicas for all temperatures; performing quantum annealing for each replica at any temperature, comprising phasing in and out quantum fluctuations; and performing parallel tempering Metropolis updates for a pair of neighboring temperatures.

In some implementations the initial input state of the quantum system is a state of the quantum system whose ground state encodes the solution to an optimization task.

In some implementations determining that the completion of the first event has occurred comprises performing a measurement on a final state in the sequence of input states to determine the solution to the optimization task.

In some cases the method further comprises representing the quantum system as a graph and partitioning the graph into one or more local regions according to the optimization task.

In some implementations performing quantum annealing on a sequence of input states comprises: determining that (i) parallel tempering and (ii) the cluster update algorithm are failing to overcome one or more energy barrier in the energy landscape at a given temperature; in response to the determining, applying quantum fluctuations on one or more of the local regions at the given temperature.

In some cases performing quantum annealing and one or more of (i) parallel tempering, or (ii) a cluster update algorithm, on a sequence of input states until a completion of a first event is an ergodic process.

In some aspects an apparatus includes an annealing system comprising a quantum integrated circuit in communication with a classical integrated circuit, the annealing system configured to: obtain a set of initial input states to initialize a set of quantum systems from the output of a set of classical information processing units and returning the outputs of quantum systems as inputs to the classical processors; apply any combinations of (i) dynamical thermal fluctuations and/or (ii) cluster update algorithms when the states evolve within classical information processors; apply dynamical quantum fluctuations when the states evolve within the quantum systems; and repeat the application steps until a desirable output state is obtained.

In some cases the quantum integrated circuit comprises one or more stacks of two dimensional arrays of qubits.

In some cases the qubits comprise fluxmon qubits.

In some aspects an apparatus includes an annealing system comprising a quantum system in communication with a thermal bath, the annealing system configured to: obtain a set of initial input states to initialize a set of quantum systems from the output of a set of classical information processing units and returning the outputs of quantum systems as inputs to the classical processors; apply any combinations of (i) dynamical thermal fluctuations and/or (ii) cluster update algorithms when the states evolve within classical information processors; apply dynamical quantum fluctuations when the states evolve within the quantum systems; and repeat the application steps until a desirable output state is obtained.

The subject matter described in this specification can be implemented in particular ways so as to realize one or more of the following advantages.

Unlike other quantum, classical or hybrid processors, a hybrid quantum-classical processor as described in this specification uses simultaneous advantages of quantum and classical fluctuations in a quantum-classical algorithm that may be used to solve hard optimization tasks. For example, in some cases the hybrid quantum-classical processor described in this specification may obtain solutions to NP hard optimization tasks. Furthermore, the run time of the hybrid quantum-classical processor described in this specification may be significantly faster, e.g., orders of magnitude faster, than other classical computers or current quantum annealing processors when solving certain classes of hard combinatorial optimization problems.

A key characteristic of the hybrid quantum-classical optimization architecture described in this specification is that three major outstanding shortcomings of existing quantum annealers associated with (i) their restricted embedding of problem classes when they involve non-sparse connectivity graphs and/or k-local interactions, (ii) their finite range multi-qubit co-tunneling effects, (iii) and their finite size may all be bypassed.

Furthermore, unlike existing hybrid quantum-classical processors, the hybrid quantum-classical processor described in this specification is not limited to iterative classical preprocessing and post processing steps or to being involved with dynamical interactions related to only control circuitry that can direct and stabilize logical operations. Rather, the interactions of a quantum and classical chip included in the described hybrid quantum-classical processor may be fundamentally constructed from an algorithmic perspective.

Unlike other hybrid quantum-classical processors or proposals for hybrid quantum-classical processors, the quantum-classical processor described in this specification may be physically realized using current or near-term hardware.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification described a method for using a hybrid quantum-classical information processor for solving optimization and inference problems. The method utilizes simultaneous advantages of both quantum and classical fluctuations, optionally together with collective spin updates, in a generalized quantum-classical annealing algorithm. At a core of the approach is the development of a non-trivial quantum-assisted meta-heuristic algorithm. In the proposed algorithm quantum and classical machines exchange information in an algorithmic fashion during an entire computation. For example, interactions of a quantum and classical chip are fundamentally constructed from an algorithmic perspective.

Figure 1A:
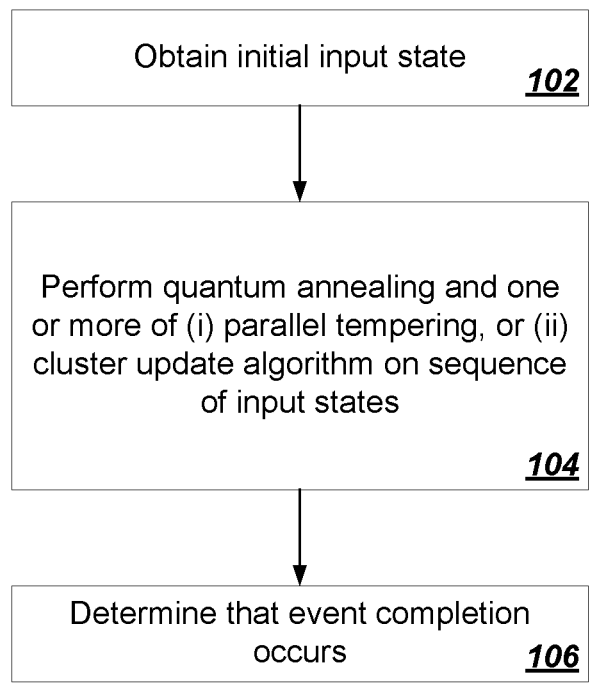
FIGS. 1A and 1B are flow diagrams of example processes for performing quantum assisted optimization.

FIG. 1A is a flowchart of an example process 100 for performing quantum assisted optimization. The process 100 combines two complementary classical and quantum algorithms for optimization under a unified algorithm such that all algorithmic subroutine advantages may be combined and their individual shortcomings avoided. For convenience, the process 100 will be described as being performed by a system of one or more classical or quantum computing devices located in one or more locations.

The system obtains an initial input state of a quantum system (step 102). The quantum system may be associated with a corresponding non-convex energy landscape including multiple energy barriers. In some implementations the initial input state of the quantum system is a state of the quantum system whose ground state encodes the solution to an optimization task, e.g., a binary combinatorial optimization problem.

Optionally, the system may represent the quantum system as a graph and partition the graph into one or more local regions according to the optimization task. For example, the system may represent the quantum system as a connected graph where graph nodes represent qubits and graph edges represent interactions between qubits. The system may be associated with a configuration space, i.e. the space of all possible configurations where a configuration is specified by the positions of all the components parts. The system may incorporate efficient graph preprocessing steps in the process 100 by dividing optimization tasks into local regions of the graph in which corresponding quantum or classical mechanical cluster updates can be beneficial, i.e., allowing for quantum fluctuations to be invoked on certain finite regions of the configuration space of the quantum system at any given temperature when parallel tempering and cluster move algorithms (as described below with reference to step 104) are inefficient in creating desired tunneling through certain barriers, e.g., tall and thin barriers, in the energy landscape.

The system performs quantum annealing and one or more of (i) parallel tempering, or (ii) a cluster update algorithm, on a sequence of input states. Quantum annealing is performed with dynamic quantum fluctuations, e.g., increasing and decreasing quantum fluctuations (step 104). The system performs quantum annealing and one or more of (i) parallel tempering, or (ii) a cluster update algorithm until a completion of a first event.

In some implementations the system may iteratively perform quantum annealing and one or more of (i) parallel tempering, or (ii) a cluster update algorithm, on a sequence of input states. For example, in one iteration the system may perform one or more of (i) parallel tempering, or (ii) a cluster update algorithm on an input state to generate a classically evolved state, perform quantum annealing on the classically evolved state to generate a quantum evolved state, and provide the quantum evolved state as input to a next iteration.

The process of performing quantum annealing and one or more of (i) parallel tempering, or (ii) a cluster update algorithm, on a sequence of input states until a completion of a first event is an ergodic process. By incorporating classical parallel tempering into the process ergodicity may be guaranteed, even in cases where the quantum annealing subroutine itself is not ergodic, e.g., due to many-body localization effects in strongly disordered problem classes. Parallel tempering, e.g., with quantum fluctuation strength $\Gamma=0$, can guarantee ergodicity for both classical and quantum clustering updates that are complementary and individually are non-ergodic.

Performing parallel tempering on the sequence of input states may include performing parallel tempering on a first input state and subsequent input states to overcome one or more energy barrier until an energy barrier that cannot be overcome by parallel tempering is encountered and terminating parallel tempering on the initial input state and subsequent input states in response to determining that the energy barrier cannot be overcome by parallel tempering. Parallel tempering is a generalization of simulated annealing, and uses thermal fluctuations to escape from local minima that are separated by shallow barriers in the energy landscape. The theory of parallel tempering and its application are described in more detail in "*Parallel Tempering: Theory. Applications, and New Perspectives*" David J. Earl and Michael W. Deem, http://arxiv.org/pdf/physics/0508111.pdf, disclosure of which is incorporated herein by reference.

In some implementations performing parallel tempering on a sequence of input states includes generating a plurality of replicas of the initial input state of the quantum system, and for each of a set of different temperatures, evolving one or more of the replicas of the initial input state of the quantum system. Performing parallel tempering may then include exchanging pairs of evolved replicas at different temperatures according to Metropolis criterion to overcome one or more energy barriers. In some implementations evolving one or more replicas of the initial input state of the quantum system is performed in parallel using multiple copies of the initial input state and quantum system. In other implementations evolving one or more replicas of the initial input state of the quantum system is performed sequentially for each replica of the initial input state of the quantum system in turn. Performing parallel tempering is illustrated as described in more detail below with reference to FIG. 3.

Optionally, the system may perform a cluster update algorithm on the sequence of input states including performing a cluster update algorithm on the sequence of input states to overcome an energy barrier that cannot be overcome by parallel tempering. In some implementations the cluster update algorithm includes a Houdayer cluster move algorithm. The cluster update algorithm may handle parallel tempering shortcomings by allowing for multiple spin updates at once, thus overcoming barriers in the energy landscape that parallel tempering may not overcome, e.g., tall barriers with large Hamming distances. The system may introduce Houdayer cluster moves between replicas at a given temperature T with $\Gamma=0$. Houdayer cluster moves are described in more detail in "*A Cluster Monte Carlo Algorithm for 2-Dimensional Spin Glasses*" J. Houdayer, http://arxiv.org/pdf/cond-mat/0101116.pdf, the disclosure of which is incorporated herein by reference.

In some implementations parallel tempering and the cluster update algorithm are performed in parallel.

Performing quantum annealing on the sequence of input states may include determining that an energy barrier that cannot be overcome by the cluster update algorithm is encountered, and in response to determining that an energy barrier that cannot be overcome by the cluster update algorithm is encountered, performing quantum annealing on the sequence of input states to overcome the energy barrier that cannot be overcome by the cluster update algorithm. Quantum annealing may be performed in a non-sequential manner similar in nature to parallel tempering that has temperature as a dynamic variable. Quantum annealing may improve over parallel tempering or cluster move updates by allowing for isothermal tunneling through tall and thin energy barriers at any fixed temperature, even in cases where the system is above a predetermined system percolation threshold.

As described above with reference to step 102, in some implementations the initial input state of the quantum system is a state of the quantum system whose ground state encodes the solution to an optimization task, and the system may represent the quantum system as a graph and partition the graph into one or more local regions according to the optimization task. In such cases, performing quantum annealing on the sequence of input states may include determining that (i) parallel tempering and (ii) the cluster update algorithm are failing to overcome one or more energy barrier in the energy landscape at a given temperature and, in response to the determining, applying quantum fluctuations on one or more of the local regions at the given temperature. By applying quantum fluctuations on only certain regions of the configuration space of the system, different quantum replicas operating in different $\Gamma$ can invoke quantum fluctuations on different finite-size regions of the configuration space that are locally possible to embed with existing quantum hardware and can still benefit from finite range quantum co-tunneling.

The system determines that the completion of the first event has occurred (step 106). As described above with reference to step 102, in some implementations the initial input of the quantum system is a state of the quantum system whose ground state encodes the solution to an optimization task. In these cases, the system may determine that the completion of the first event has occurred by performing a measurement on a final state in the sequence of input states to determine the solution to the optimization task.

In some implementations the system determines that the completion of the first event has occurred by determining that a final state in the sequence of input states adequately approximates a ground state of the quantum system. In some implementations a final state may adequately approximate a ground state of the quantum system after performing quantum annealing and one or more of (i) parallel tempering, or (ii) a cluster update algorithm, on the sequence of input states in polynomial time.

Figure 1B:
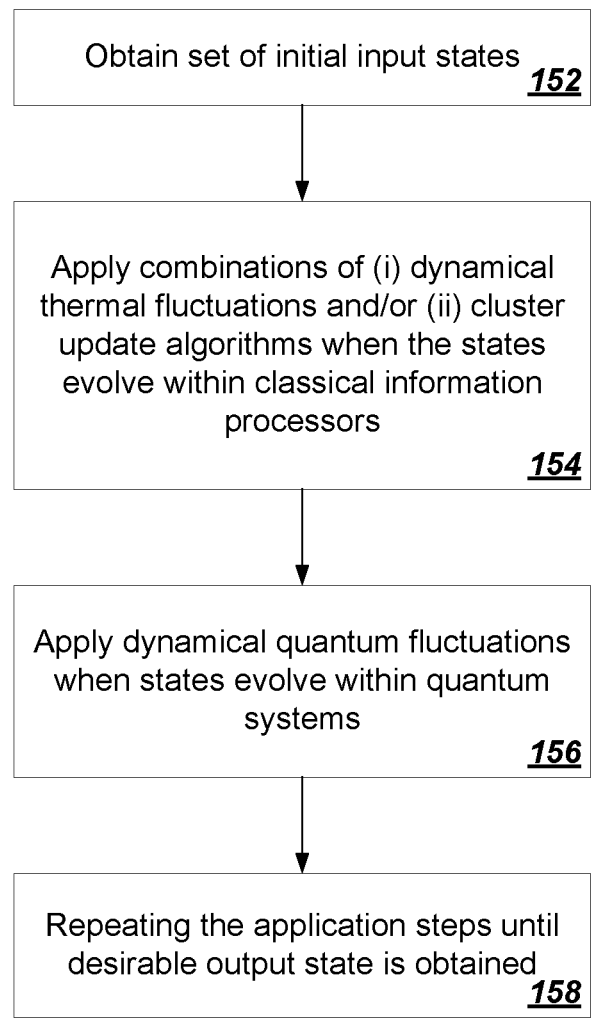

FIG. 1B is a flowchart of an example process 150 for performing quantum assisted optimization. The process 150 combines two complementary classical and quantum algorithms for optimization under a unified algorithm such that all algorithmic subroutine advantages may be combined and their individual shortcomings avoided. For convenience, the process 150 will be described as being performed by a system of one or more classical or quantum computing devices located in one or more locations.

The system obtains a set of initial input states (step 152). The system may obtain the set of initial input states to initialize a set of quantum systems from an output of a set of classical information processing units. The system may return the outputs of the quantum systems as inputs to the classical processors.

The system applies any combination of (i) dynamical thermal fluctuations and/or (ii) cluster update algorithms to the set of input states and subsequent input states when the states evolve within classical information processors (step 154).

In some implementations the dynamical classical fluctuations include tempered transitions, such as a parallel tempering algorithm. In further implementations the dynamical classical fluctuations include weighted dynamical tempered transitions, such as annealing importance sampling. In some implementations the cluster update algorithms create non-local state transformation in parameter space in various different temperatures. In other examples the cluster update algorithms create non-local isothermal state transformation in parameter space, such as Houdayers cluster move algorithm.

The system applies dynamical quantum fluctuations to the set of input states and subsequent input states when the states evolve within quantum systems (step 156).

In some implementations dynamic quantum fluctuations include increasing and decreasing zero-temperature quantum fluctuations via applying driven fields. In further implementations dynamic quantum fluctuations include increasing and decreasing finite-temperature dissipative quantum fluctuations via applying driven fields.

The system repeats the application steps 154 and 156 until a desirable output state is obtained. In some implementations convergence to a final desired state is achieved via feed forward steps in a highly parallelizable set of classical and quantum processors. In further implementations convergence to a final desired state is iterative with feedback loops on a same set of quantum and/or classical processors.

Figure 2:
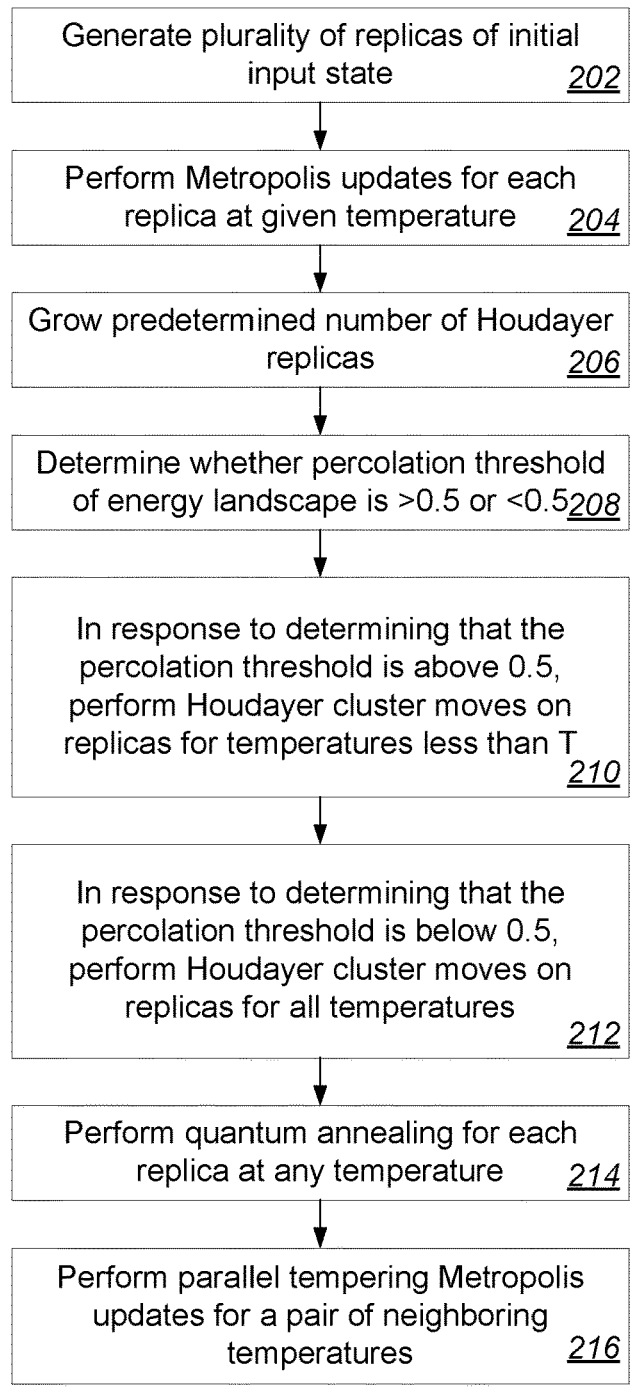
FIG. 2 is a flow diagram of an example process for performing quantum assisted annealing using parallel tempering and Houdayer clustering.

FIG. 2 is a flowchart of an example process 200 for performing quantum assisted annealing using parallel tempering and Houdayer clustering. For convenience, the process 200 will be described as being performed by a system of one or more classical or quantum computing devices located in one or more locations.

The system generates a plurality of replicas of an initial input state of the quantum system (202).

The system performs a first predetermined number of Metropolis updates for each replica at a given temperature (step 204). For example, in cases where the quantum system includes a spin system, the system may perform a predetermined number of one-spin flip moves.

The system grows a second predetermined number of Houdayer replicas (step 206).

The system determines whether a percolation threshold for an energy landscape associated with the quantum system is above or below a predetermined threshold, e.g., 0.5 (step 208).

In response to determining that the percolation threshold for the energy landscape associated with the quantum system is above the predetermined threshold, the system performs one or more Houdayer cluster moves on the replicas for temperatures less than a predetermined temperature value (step 210).

In response to determining that the percolation threshold for the energy landscape associated with the quantum system is below the predetermined threshold, the system performs one or more Houdayer cluster moves on the replicas for all temperatures (step 212).

The system performs quantum annealing for each replica at any temperature, comprising phasing in and out quantum fluctuations (step 214).

The system performs parallel tempering Metropolis updates for a pair of neighboring temperatures (step 216).

Figure 3:
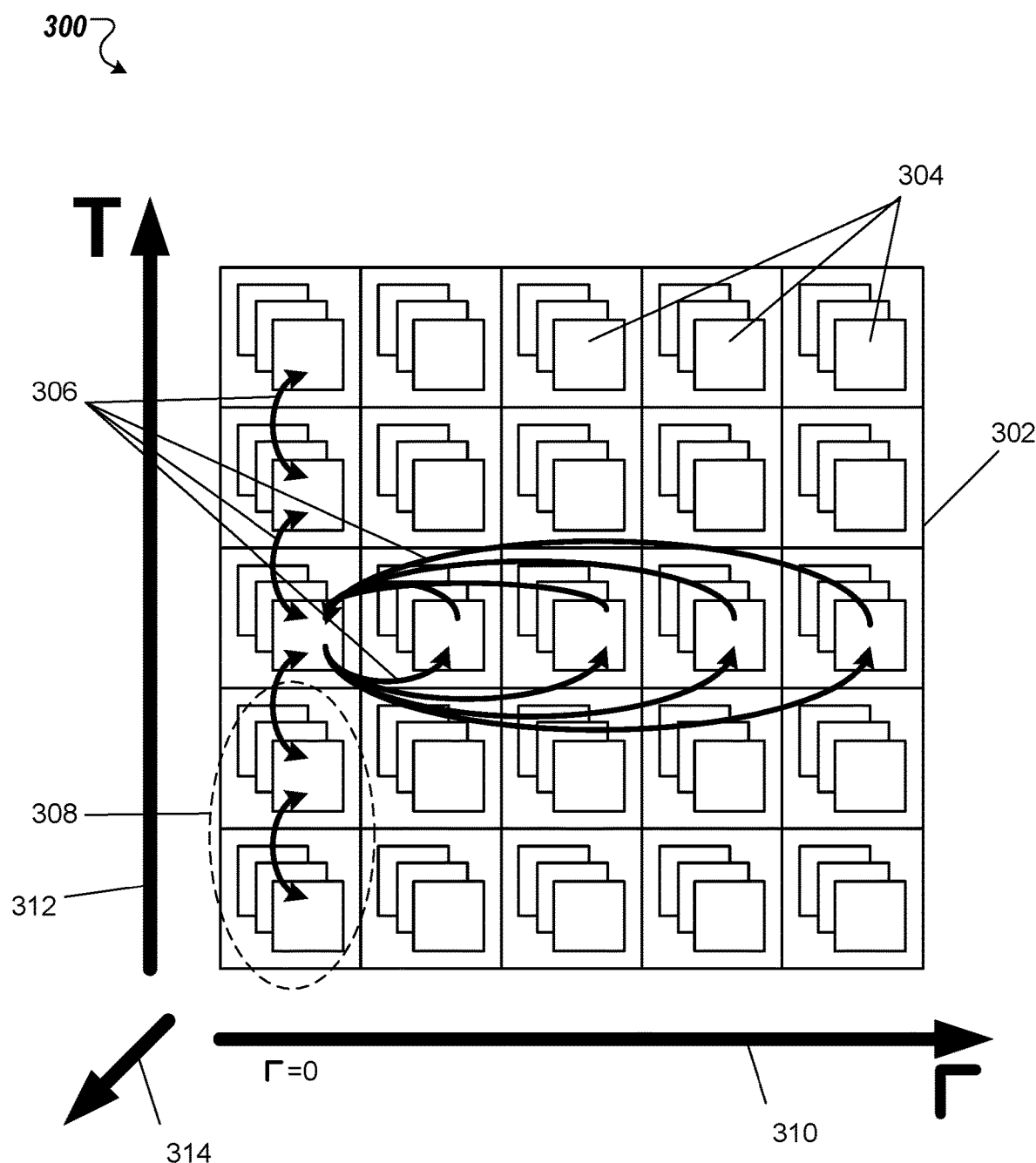
FIG. 3 is an example illustration of performing quantum assisted optimization.

FIG. 3 is an example illustration 300 of a quantum processor for performing quantum assisted optimization as described above with reference to FIGS. 1 and 2. The example quantum processor is an example of a system implemented as classical or quantum computer programs on one or more classical computers or quantum computing devices in one or more locations, in which the systems, components, and techniques described above can be implemented.

The example quantum processor can be constructed from superconducting components including stacks of two-dimensional arrays of qubits 302, e.g., fluxmon qubits. The architecture illustrated in FIG. 3 may have the capacity of embedding a class of tasks that may be graphically represented as graphs with large tree widths, small radii, and high conductance. In order to reduce the heat dissipation, superconducting components may be used for all classical operations, e.g., parallel tempering or cluster updates, as well as quantum operations. All quantum and classical logical gates may therefore exist in the same sub-Kelvin temperatures. In the above, for convenience, it is assumed that classical processors may be digital and may operate near room temperature.

The quantum processor illustrated in FIG. 3 includes a three dimensional array of replicas 304. A replica in a possible coordinate [h(s), T(s), c(s)] is related to a particular setting of quantum, h(s), and thermal fluctuations, T(s), and cluster moves c(s) where s is parameter that labels a particular instance of the processor and can be considered as time if the algorithm is realized on a single processor— otherwise s labels one replica in an ensemble of processors running in parallel. In other words, each replica can be the same processor in a different time or alternatively each replica can be implemented by separate classical or quantum processors. The plane x=0 includes classical replicas. A Metropolis update algorithm governs the state transformation of each replica.

The variation in the x-axes 310 demonstrates various degrees of quantum fluctuations Γ, the variation in the y-axes 312 labels different degrees of thermal fluctuations T, and the variation in the z axes 314 labels particular cluster updates according to Houdayer moves. To grow clusters according to a Houdayer algorithm, as described above with reference to FIG. 2, the system may multiply the values of two neighboring columns in z and swap them if the percolation threshold for that particular temperature is not above a predetermined threshold.

The updates in each column are governed by parallel tempering, where in each cycle N runs of Metropolis updates 306 are performed and the lowest energy configuration is registered. At the end of each cycle the states of two neighboring cells may be globally swapped. Gradually it may be expected that the lowest cells for each possible h sample from the lowest energy states, e.g., 308. However, it is to be noted that the state of the lowest replica is not necessarily in the ground state.

In x direction 310, various strengths of the transverse field Γ can set up the level of quantum fluctuations. For any nonzero x, the replicas in the y direction 312 are operating at different temperatures and their states may be swapped according to parallel tempering updates. For any x and y various clusters may be grown by multiplying the corresponding values and grow clusters of positive and negative parity—provided that the particular operating temperature is below the predetermined percolation threshold. Otherwise, swapping the column in the z direction 314 may not produce any useful new states.

In some implementations it may be desirable to obtain a high quality solution from replicas that are near x=0 and y=0 after a polynomial number of cycles each involving a polynomial run of Metropolis updates 306. In other words, it may be expected that a good approximation to the ground state may be obtained after quantum and classical fluctuations are phased out in a polynomial time.

Figure 4A:
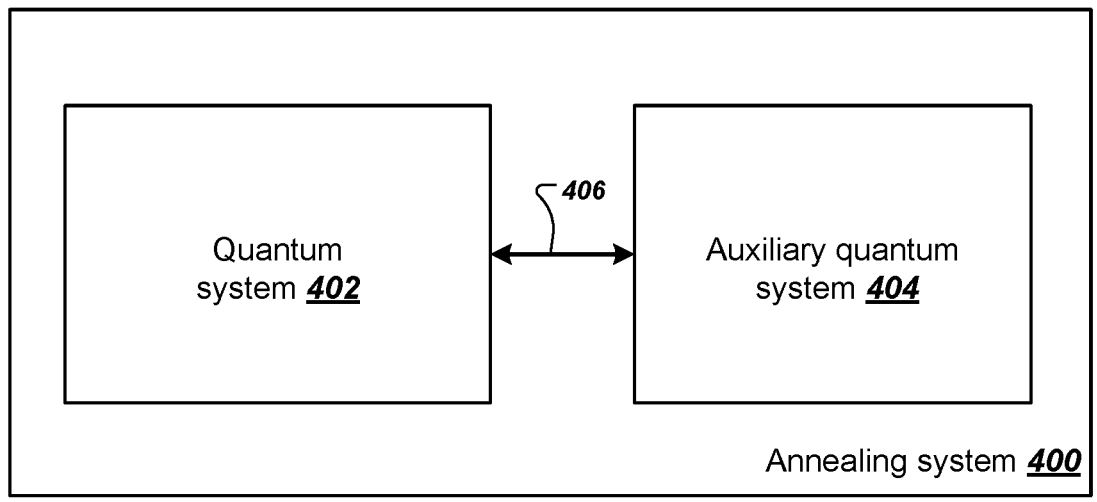
FIG. 4A depicts an example annealing system for performing quantum assisted optimization.

FIG. 4A depicts an example annealing system 400 for performing quantum assisted optimization. The example system 400 is an example of a system implemented as classical or quantum computer programs on one or more classical computers or quantum computing devices in one or more locations, in which the systems, components, and techniques described below can be implemented.

The annealing system 400 may be configured to repeatedly apply any combination of (i) dynamical thermal fluctuations and/or (ii) cluster update algorithms and apply dynamical quantum fluctuations. The annealing system 400 may include a quantum system 402 that interacts with an auxiliary quantum system 404. The auxiliary quantum system 404 may act as a controllable thermal bath for the quantum system 402. The quantum system 402 may include one or more interacting quantum subsystems, e.g., one or more interacting qubits. The one or more quantum subsystems included in the quantum system 402 may include superconducting qubits. In some implementations the quantum system 402 may be an open quantum system.

The auxiliary quantum system 404 may include a set of lossy resonators, transmission lines, array of qubits, or meta-materials. In some implementations the auxiliary quantum system 404 may be an open quantum system that interacts with an environment that is external to the quantum system 402 and the auxiliary quantum system 404. In other implementations the auxiliary quantum system 404 may be a closed quantum system that does not interact with an external environment.

The quantum system 422 may interact with the auxiliary quantum system 404 through one or more couplings, e.g., coupling 406. The coupling of the auxiliary quantum system 404 to the quantum system 402 may enable the auxiliary quantum system to interact with the quantum system such that fluctuations of the auxiliary system 404 may affect the dynamics of the quantum system 402. As an example, the auxiliary quantum system 404 may include one or more multi-mode resonators, and the quantum system 402 may include one or more qubits that are either respectively coupled to a respective multi-mode resonator, or collectively coupled to a single multi-mode resonator. In some implementations the auxiliary quantum system 404 may include a continuous mode of resonators (also known as microwave metamaterial).

The one or more couplings 406 may be controllable couplings. The controllability of the couplings depends on the particular physical realization of the qubits that are coupled, e.g., two-level atoms, electron spins, or superconducting qubits. For example, in the case of electron spins, the couplings between spin qubits may be controlled via applying external electromagnetic fields, where the external electromagnetic fields in turn are controllable by adjusting the parameters of the machines used to apply the electromagnetic field, such as the wavelength and amplitude of the electromagnetic field. In the case of superconducting qubits, the interaction between the qubits may be controlled through adjusting the current bias, for example by adjusting current bias pulses with controlled amplitude and duration.

Figure 4B:
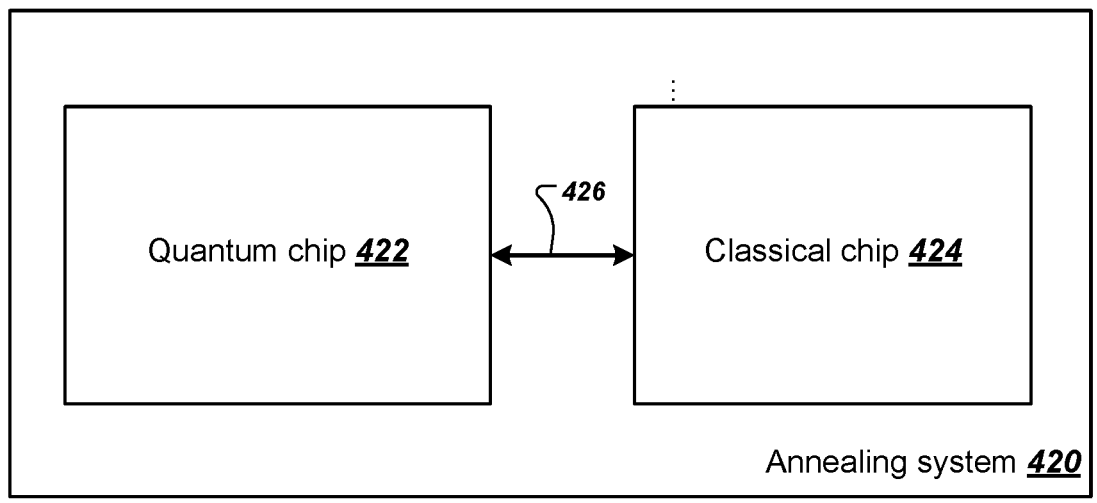
FIG. 4B depicts an example annealing system for performing quantum assisted optimization.

FIG. 4B depicts an example annealing system 420 for performing quantum assisted optimization. The example system 420 is an example of a system implemented as classical or quantum computer programs on one or more classical computers or quantum computing devices in one or more locations, in which the systems, components, and techniques described below can be implemented.

The annealing system 420 may be configured to repeatedly apply any combination of (i) dynamical thermal fluctuations and/or (ii) cluster update algorithms, and dynamical quantum fluctuations.

The annealing system 420 may include a quantum integrated circuit (chip) 422 in communication with a classical integrated circuit (chip) 424. The quantum integrated circuit 422 may be configured to apply dynamical quantum fluctuations annealing on a set of input states, and communicate with the classical integrated circuit 424 that may be configured to apply any combination of (i) dynamical thermal fluctuations and/or (ii) cluster update algorithms through one or more couplings 426.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for hybrid quantum-classical information processing, the method comprising:
    obtaining a set of initial input states of respective quantum systems, wherein each quantum system is represented by a graph and a ground state of each quantum system encodes a solution to an optimization task;
    for each initial input state:
        partitioning each graph into one or more local regions according to the optimization task;
        applying one or more of (i) dynamical thermal fluctuations and (ii) cluster update algorithms to the input states and subsequent input states when the states evolve within classical information processors;
        determining that application of the (i) dynamical thermal fluctuations and (ii) cluster update algorithm are failing to overcome one or more energy barriers in an energy landscape at a given temperature;
        in response to the determining, applying dynamical quantum fluctuations to the input states and subsequent states when the states evolve within the quantum systems, comprising applying dynamical quantum fluctuations on one or more of the local regions at the given temperature; and
    repeating the application steps until a desirable output state is obtained.

2. The method of claim 1, wherein the dynamical classical thermal fluctuations comprise tempered transitions.

3. The method of claim 2, wherein tempered transitions comprise a parallel tempering algorithm.

4. The method of claim 1, wherein the dynamical thermal fluctuations comprise weighted dynamical tempered transitions.

5. The method of claim 4, wherein weighted dynamical tempered transitions comprise annealing importance sampling.

6. The method of claim 1, wherein the cluster update algorithms create non-local state transformation in parameter space in various different temperatures.

7. The method of claim 1, wherein the cluster update algorithms create non-local isothermal state transformation in parameter space.

8. The method of claim 7, wherein the cluster update algorithms comprise Houdayers cluster move algorithm.

9. The method of claim 1, wherein applying dynamical quantum fluctuations comprises increasing and decreasing zero-temperature quantum fluctuations via application of driven fields.

10. The method of claim 1, wherein applying dynamical quantum fluctuations comprises increasing and decreasing finite-temperature dissipative quantum fluctuations via application of driven fields.

11. The method of claim 1, wherein convergence to the desirable state is achieved via feed forward steps in a highly parallelizable set of classical and quantum processors.

12. The method of claim 1, wherein convergence to the desirable state is iterative with feedback loops on a same set of quantum and/or classical processors.

13. A method for hybrid quantum-classical information processing, the method comprising:
obtaining an initial input state of a quantum system, wherein the quantum system is represented by a graph and a ground state of the quantum system encodes a solution to an optimization task;
partitioning the graph into local regions according to the optimization task;
performing quantum annealing and one or more of (i) parallel tempering, and (ii) a cluster update algorithm, on a sequence of input states until a completion of a first event, wherein quantum annealing is performed with dynamical quantum fluctuations, the performing comprising applying the dynamical quantum fluctuations to one or more of the local regions at a given temperature in response to determining that performing the (i) parallel tempering and (ii) cluster update algorithm fails to overcome one or more energy barriers in an energy landscape at the given temperature; and
determining that the completion of the first event has occurred.

14. The method of claim 13, wherein performing quantum annealing with dynamical quantum fluctuations comprises increasing and decreasing quantum fluctuations.

15. The method of claim 13, wherein the quantum system is associated with a corresponding energy landscape comprising multiple energy barriers, and
wherein performing a cluster update algorithm on the sequence of input states comprises:
performing a cluster update algorithm on the sequence of input states to overcome an energy barrier that cannot be overcome by parallel tempering.

16. The method of claim 13, wherein the quantum system is associated with a corresponding non-convex energy landscape comprising multiple energy barriers, and
wherein performing parallel tempering on a sequence of input states comprises:
generating a plurality of replicas of the initial input state of the quantum system;
for each of a set of different temperatures, evolving one or more of the replicas of the initial input state of the quantum system; and
exchanging pairs of evolved replicas at different temperatures according to Metropolis criterion to overcome one or more energy barriers.

17. The method of claim 16, wherein evolving one or more replicas of the initial input state of the quantum system is performed in parallel using multiple copies of the initial input state and quantum system.

18. The method of claim 16, wherein evolving one or more replicas of the initial input state of the quantum system is performed sequentially for each replica of the initial input state of the quantum system in turn.

19. The method of claim 13, wherein determining that the completion of the first event has occurred comprises performing a measurement on a final state in the sequence of input states to determine the solution to the optimization task.

20. The method of claim 13, wherein performing quantum annealing and one or more of (i) parallel tempering, or (ii) a cluster update algorithm, on a sequence of input states until a completion of a first event is an ergodic process.

21. A method for hybrid quantum-classical information processing, the method comprising:
obtaining an initial input state of a quantum system, wherein the quantum system is associated with a corresponding non-convex energy landscape comprising multiple energy barriers;
performing quantum annealing and parallel tempering on a sequence of input states until a completion of a first event, wherein quantum annealing is performed with dynamical quantum fluctuations and wherein performing parallel tempering on the sequence of input states comprises:
performing parallel tempering on a first input state and subsequent input states to overcome one or more energy barrier until an energy barrier that cannot be overcome by parallel tempering is encountered; and
terminating parallel tempering on the initial input state and subsequent input states in response to determining that the energy barrier cannot be overcome by parallel tempering; and
determining that the completion of the first event has occurred.

22. A method for hybrid quantum-classical information processing, the method comprising:
obtaining an initial input state of a quantum system, wherein the quantum system is associated with a corresponding non-convex energy landscape comprising multiple energy barriers;
performing quantum annealing and a cluster update algorithm on a sequence of input states until a completion of a first event, wherein quantum annealing is performed with dynamical quantum fluctuations and wherein performing quantum annealing on the sequence of input states comprises:
determining that an energy barrier that cannot be overcome by the cluster update algorithm is encountered;
in response to determining that an energy barrier that cannot be overcome by the cluster update algorithm is encountered, performing quantum annealing on the sequence of input states to overcome the energy barrier that cannot be overcome by the cluster update algorithm; and
determining that the completion of the first event has occurred.

23. A method for hybrid quantum-classical information processing, the method comprising:
obtaining an initial input state of a quantum system;

performing quantum annealing and one or more of (i) parallel tempering, or (ii) a cluster update algorithm, on a sequence of input states until a completion of a first event, wherein quantum annealing is performed with dynamical quantum fluctuations, wherein performing quantum annealing and one or more of (i) parallel tempering, or (ii) a cluster update algorithm, on a sequence of input states comprises:

generating a plurality of replicas of the initial input state of the quantum system;

performing a first predetermined number of Metropolis updates for each replica at a given temperature;

growing a second predetermined number of Houdayer replicas;

determining whether a percolation threshold for an energy landscape associated with the quantum system is above or below 0.5;

in response to determining that the percolation threshold for the energy landscape associated with the quantum system is above 0.5, performing one or more Houdayer cluster moves on the replicas for temperatures less than a predetermined temperature value;

in response to determining that the percolation threshold for the energy landscape associated with the quantum system is below 0.5, performing one or more Houdayer cluster moves on the replicas for all temperatures;

performing quantum annealing for each replica at any temperature, comprising phasing in and out quantum fluctuations; and performing parallel tempering Metropolis updates for a pair of neighboring temperatures; and determining that the completion of the first event has occurred.

24. An apparatus comprising:
an annealing system comprising a quantum integrated circuit in communication with a classical integrated circuit, the annealing system configured to:
obtain a set of input states to initialize a set of quantum systems from the output of a set of classical information processing units and returning the outputs of quantum systems as inputs to classical information processors, wherein a ground state of each quantum system encodes a solution to an optimization task and each quantum system is represented by a graph, wherein the graph is partitioned into local regions according to the optimization task;
apply any combinations of (i) dynamical thermal fluctuations and (ii) cluster update algorithms when the states evolve within the classical information processors;
in response to determining that application of the (i) dynamical thermal fluctuations and (ii) cluster update algorithms fails to overcome one or more energy barriers in an energy landscape at a given temperature, apply dynamical quantum fluctuations when the states evolve within the quantum systems, wherein the dynamical quantum fluctuations are applied to one or more of the local regions at the given temperature; and repeat the application steps until a desirable output state is obtained.

25. The apparatus of claim 24, wherein the quantum integrated circuit comprises one or more stacks of two dimensional arrays of qubits.

26. The apparatus of claim 25, wherein the qubits comprise fluxmon qubits.

27. An apparatus comprising:
an annealing system comprising a quantum system in communication with a thermal bath, the annealing system configured to:
obtain a set of input states to initialize a set of quantum systems from the output of a set of classical information processing units and returning the outputs of quantum systems as inputs to classical information processors, wherein a ground state of each quantum system encodes a solution to an optimization task and each quantum system is represented by a graph, wherein the graph is partitioned into local regions according to the optimization task;
apply any combinations of (i) dynamical thermal fluctuations and (ii) cluster update algorithms when the states evolve within the classical information processors;
in response to determining that application of the (i) dynamical thermal fluctuations and (ii) cluster update algorithms fails to overcome one or more energy barriers in an energy landscape at a given temperature, apply dynamical quantum fluctuations when the states evolve within the quantum systems, wherein the dynamical quantum fluctuations are applied to one or more of the local regions at the given temperature; and repeat the application steps until a desirable output state is obtained.

* * * * *